G. B. KIRKHAM.
Chuck.
No. 222,056.                Patented Nov. 25, 1879.
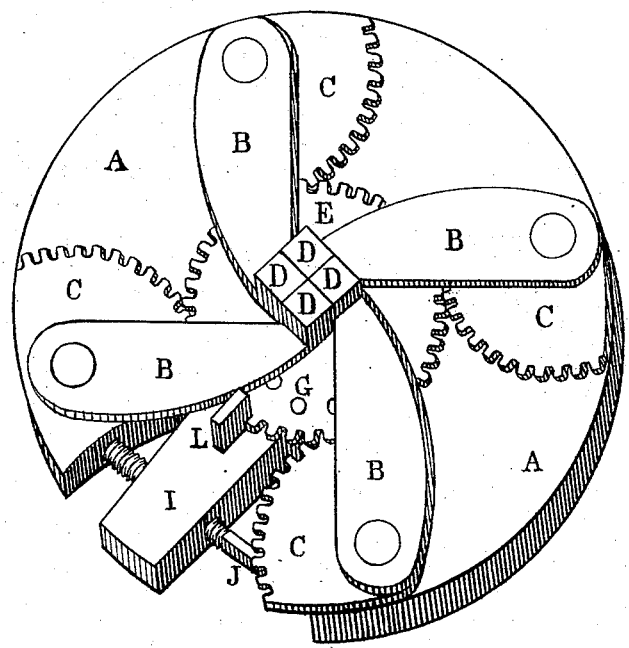
WITNESSES.                INVENTOR.
A. L. Watson            Geo. Byron Kirkham
H. M. Pain

UNITED STATES PATENT OFFICE.

GEORGE B. KIRKHAM, OF NEW YORK, N. Y.

IMPROVEMENT IN CHUCKS.

Specification forming part of Letters Patent No. 222,056, dated November 25, 1879; application filed January 31, 1879.

*To all whom it may concern:*

Be it known that I, GEORGE BYRON KIRKHAM, residing at 167 East Thirty-third street, New York city, county and State of New York, have invented a new Chuck, of which the following is a specification.

The object of my invention is to make a chuck which shall be self-centering, will hold the work either inside or outside of it, and have widely-expanding jaws and a powerful gripe.

The drawing represents a general perspective view of the chuck looking toward the face of it.

In the figure, A A is the face or bed-plate of the chuck, which is attached to the lathe or machine on which it is used in the usual way. B B are the jaws, which form a solid piece each with its segmental cog-wheel C C. The jaws may be three, four, or more in number. These jaws are pivoted to the bed-plate A, and have a projection, D, which holds the work either inside or outside of it. The jaws are expanded or closed by the central cog-wheel, E, which rotates on A.

To give the gripe to the jaws B a lever, I, is located underneath E on the same axle, and holes G G G are drilled through both, in which a pin is inserted to hold them together. This pin is movable from one hole to another, being withdrawn at the back of the chuck, and when the jaws B D are placed against the work the pin is inserted in the proper hole G, and the gripe given by the set-screw J, which bears at either end against the slotted side of A.

A key, L, and slots in E can be used instead of the pin and holes G G, or any kind of catch to hold E and I together.

What I claim as my invention is—

1. The combination of the face-plate A, the jaws B D, the wheels C, and the cog-wheel E, substantially as and for the purpose hereinbefore set forth.

2. The combination of the face-plate A, cut away as described, the set-screw J, the lever I, the wheel E, and means for connecting the wheel E and lever I together, substantially as and for the purpose hereinbefore set forth.

3. The jaw B, when terminated by the projection D, to hold the work by inside or outside contact, substantially as and for the purpose hereinbefore set forth.

GEORGE BYRON KIRKHAM.

Witnesses:
A. L. WATSON,
H. M. PAIN.